(12) United States Patent
Zhu et al.

(10) Patent No.: US 11,122,777 B2
(45) Date of Patent: Sep. 21, 2021

(54) RETRACTABLE PET TRACTION ROPE

(71) Applicant: Suzhou Petmate Industry & Trade Co., Ltd., Suzhou (CN)

(72) Inventors: Haiyuan Zhu, Suzhou (CN); Xinggen Huang, Suzhou (CN)

(73) Assignee: SUZHOU PETMATE INDUSTRY & TRADE CO., LTD., Suzhou (CN)

( * ) Notice: Subject to any disclaimer, the term of this patent is extended or adjusted under 35 U.S.C. 154(b) by 608 days.

(21) Appl. No.: 15/761,805

(22) PCT Filed: Dec. 21, 2017

(86) PCT No.: PCT/CN2017/117742
§ 371 (c)(1),
(2) Date: Mar. 20, 2018

(87) PCT Pub. No.: WO2018/077314
PCT Pub. Date: May 3, 2018

(65) Prior Publication Data
US 2019/0150403 A1     May 23, 2019

(30) Foreign Application Priority Data
Oct. 24, 2016    (CN) .......................... 201610926370.7

(51) Int. Cl.
*A01K 27/00*      (2006.01)
*B65H 75/44*      (2006.01)
*B65H 75/48*      (2006.01)

(52) U.S. Cl.
CPC ....... *A01K 27/004* (2013.01); *B65H 75/4471* (2013.01); *B65H 75/48* (2013.01)

(58) Field of Classification Search
CPC .... A01K 27/004; A01K 27/003; B65H 75/48; B65H 75/265
USPC .......................... 119/796, 797, 794, 795, 798
See application file for complete search history.

(56) References Cited

U.S. PATENT DOCUMENTS

| | | | |
|---|---|---|---|
| 3,693,596 A * | 9/1972 | Croce | .................. A01K 27/004 |
| | | | 119/796 |
| 4,562,792 A * | 1/1986 | Pak | ...................... A01K 27/003 |
| | | | 119/797 |
| 2005/0184186 A1 | 8/2005 | Tsoi et al. | |
| 2011/0041778 A1* | 2/2011 | Le Croix | ........... B65H 75/4431 |
| | | | 119/796 |

(Continued)

FOREIGN PATENT DOCUMENTS

| | | |
|---|---|---|
| AU | 2013221961 A1 | 3/2015 |
| CN | 104969874 A | 10/2015 |

(Continued)

*Primary Examiner* — Peter M Poon
*Assistant Examiner* — Jeffrey R Larsen
(74) *Attorney, Agent, or Firm* — SZDC Law PC

(57) ABSTRACT

A retractable pet traction rope is provided. The retractable pet traction rope includes a leash, whose two ends are respectively a pet connection end for connecting a pet and a holding end for a tractor to hold for control, wherein the retractable pet traction rope further includes an elastic leash winding device, into which the leash is wound, with both ends of the leash respectively extending out of the elastic leash winding device. The retractable pet traction rope has the advantage of quick retractable speed, high structural strength, small body size, and convenient carriage.

11 Claims, 7 Drawing Sheets

(56) References Cited

U.S. PATENT DOCUMENTS

2013/0119178 A1* 5/2013 Masuda ............. B65H 75/4428
242/378.1
2016/0165849 A1* 6/2016 Lewis .................. A01K 27/003
119/770

FOREIGN PATENT DOCUMENTS

| CN | 105731195 A | 7/2016 |
| CN | 105775928 A | 7/2016 |
| CN | 106417074 A | 2/2017 |
| CN | 206182083 U | 5/2017 |
| JP | 2001008348 A | 1/2001 |
| WO | 0152635 A1 | 7/2001 |

* cited by examiner

RETRACTABLE PET TRACTION ROPE

This application is a national stage application of PCT/CN2017/117742, filed on Dec. 21, 2017, which claims priority to Chinese Patent Application No.: 201610926370.7, filed on Oct. 24, 2016, which is incorporated by reference for all purposes as if fully set forth herein.

TECHNICAL FIELD

The present invention relates to the field of pet care products, in particular to a retractable pet traction rope.

BACKGROUND

In order to prevent a pet from straying, it is often equipped with a traction rope. Currently, most of the structures on the market for pet traction ropes are shown in FIG. 1, each comprising a housing, a reel disposed within the housing, a coil spring connected between the housing and the reel, and a leash wound on the reel. Wherein the head end of the leash is led out from the leash outlet on the housing for connecting the pet, and the tail end of the leash is fixedly connected to a loading plate. There is a handle on the housing. In the actual application, the owner holds the handle on the housing and the head end of the leash holds the pet. When the pet runs away, the reel rotates in the forward direction, and the leash wound on the reel is released outward; when the pet gets close to the owner, the reel rotates in the backward direction under the torsional spring force of the coil spring, so that the released leash is rewound on the reel.

This structure of pet traction ropes has the following disadvantages:

1. The head end of the leash is connected to the pet, while the tail end of the leash is connected to the reel. While in use, the owner holds the handle on the housing instead of the leash itself. When the leash is all pulled out, the pet's pull on the leash will act on the site of connection of the tail end of the leash to the reel. With the strength of connection of the tail end of the leash to the reel clearly far below the tensile strength of the leash itself, long-term uses in the manner above will prone to the problem that the leash is off the reel at the site of connection. Even if the reliability of the connection of the leash to the reel is enhanced, the plastic reel itself may also be broken at the point of connection due to long-term pulling of the leash.

2. The housing is provided with a variety of accessories for releasing and locking the length of the leash, which increases the size and weight of the housing to some extent, making the pet owner prone to fatigue during use.

3. Since the leash in the reel can only be retracted or released in a circle, when the leash is converted from a fully wound-up state to a fully released state, the number of turns of the reel is large, and so is the torsional deformation trip of the coil spring. So it is necessary to use the long coil spring structure so as to ensure the service life of the coil spring, which in turn increases the size and weight of the housing to some extent.

4. Since the leash in the reel can only be retracted or released in a circle, the speed of retracting and releasing the leash is slow. When the pet runs away quickly, the reel has no enough time to turn the appropriate number of turns, which is easy to make the owner hurt or fall by being pulled. When the pet runs back quickly, the reel has no enough time to turn the appropriate number of turns, either, which is easy to make the leash wound around something in the environment (such as trees, street lamps, etc.), or even make the pet or the owner tripped up.

5. With the tail end of the leash fixed on the reel inside the housing, only the handle on the outside of the housing is for the user to hold, and thus the user cannot use the traction rope of this structure to tie the pet to something in the environment (such as trees, street lamps, railings, etc.).

SUMMARY

In view of the above problems, an object of the present invention is to provide a retractable pet traction rope with quick retractable speed, high structural strength, small body size, and convenient carriage and usage.

A technical solution of the present invention is as follows: A retractable pet traction rope is provided, comprising a leash, whose two ends are respectively a pet connection end for connecting a pet and a holding end for a tractor to hold for control; the retractable pet traction rope further includes an elastic leash winding device, into which the leash is wound, with both ends of the leash respectively extending out of the elastic leash winding device.

Based on the above technical solution, the present invention further includes the following preferred solution:

The elastic leash winding device comprises:

a housing having a housing cavity as well as a first leash outlet and a second leash outlet communicating the housing cavity with the environment;

a reel rotatably disposed in the housing cavity of the housing; and a coil spring connected between the reel and the housing, and torsionally deformed to exert a torsional restoring force in a backward direction on the reel when the reel is rotated in a forward direction with respect to the housing.

The leash has a reel fixing portion located between the pet connection end and the holding end and fixedly connected with the reel; with the reel fixing portion as a separating point, the leash is partitioned into a front leash on the side close to the pet connection end and a rear leash on the side close to the holding end; with the reel fixing portion as a winding starting point, the front and rear leashes are wound on the reel in the same circumferential direction; and the pet connection end and the holding end extend out of the housing through the first and second leash outlets, respectively.

The reel fixing portion of the leash is detachably snap-fitted on the reel.

An arc-shaped slot is formed in the reel, and the length of the arc-shaped slot penetrates through the reel such that two through holes are formed on the edge of the reel, with the reel fixing portion of the leash snap-fitted in the arc-shaped slot.

Two metal pins respectively arranged at the two through holes are fixed on the reel.

The metal pin has a cylindrical structure and is arranged parallel to a central axis of the reel.

The reel fixing portion of the leash is fixed on the outer edge of the reel.

The housing comprises a left housing wall and a right housing wall arranged in parallel and a lateral housing wall vertically connected between the left and right housing walls, with the first and second leash outlets both formed in the lateral housing wall.

The lateral housing wall is provided with a weight reduction hole.

The housing further comprises a fixed shaft vertically fixed between the left and right housing walls, with the coil spring connected between the reel and the fixed shaft.

A buckle is connected to the pet connection end of the leash, and a holding hole is formed in the holding end of the leash.

A buckle is respectively connected to the pet connection end and the holding end of the leash.

The present invention has the following advantages:

1. With the two ends of the leash of the pet traction rope of the present invention directly connected to a pet and a user, respectively, when the traction rope is fully extended, the pulling force of the pet to the leash is directly transmitted from the leash to the user's hand. Just by ensuring that the leash itself is too high in the structural strength to be pulled broken, can the pet be prevented from escaping from the user's sight, without the problem of separation of the leash from the housing.

2. With both portions of the leash, front and rear, matching the reel in winding, the leash will retract/extend the length of two laps for each lap the reel rotates, with the retractable speed of the leash twice as much as that of the traditional structure.

3. Because the pet is directly connected with the user through a leash, the user's control of the pet depends only on the structural strength of the leash itself, and there are no strengthening requirements for the structural strength of the housing, which allows very small size and mass of the housing and ease for use.

4. The holding end of the leash can be fixedly tied directly to something in the environment, such as railings, street lamps, etc., which liberates the user's hands and is convenient for the user to rest on the spot.

5. When the pet gets close to the user, the leash extending outward will be immediately wound into the housing under the action of the return torsional force of the coil spring, so as to ensure a generally tight state of the leash exposed outside to prevent the pet from biting the leash to cause the leash rupture.

6. With the traction rope light in weight and small in size, when it is not in use, it can be hung in the waist by a hook at the end and is easy to carry.

BRIEF DESCRIPTION OF DRAWINGS

The present invention will be further described below with reference to drawings and examples.

Figure 1:
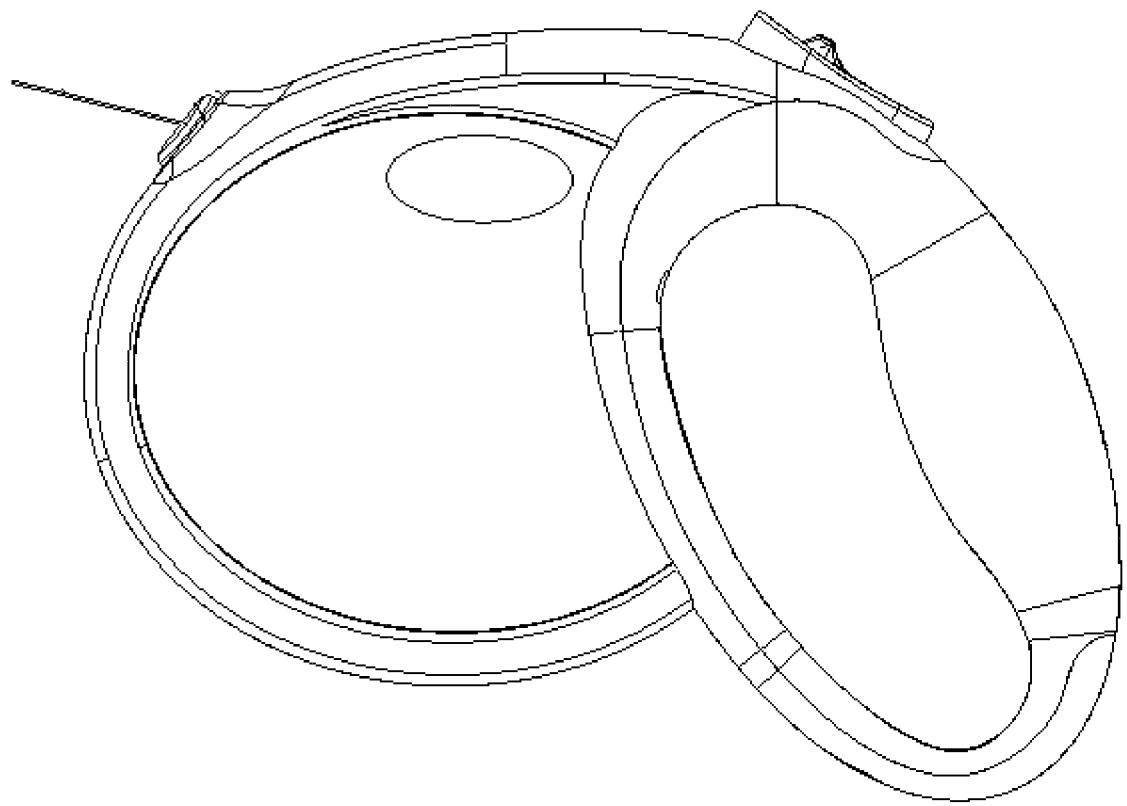
FIG. 1 is a schematic structural view of a traditional pet traction rope.
Figure 2:
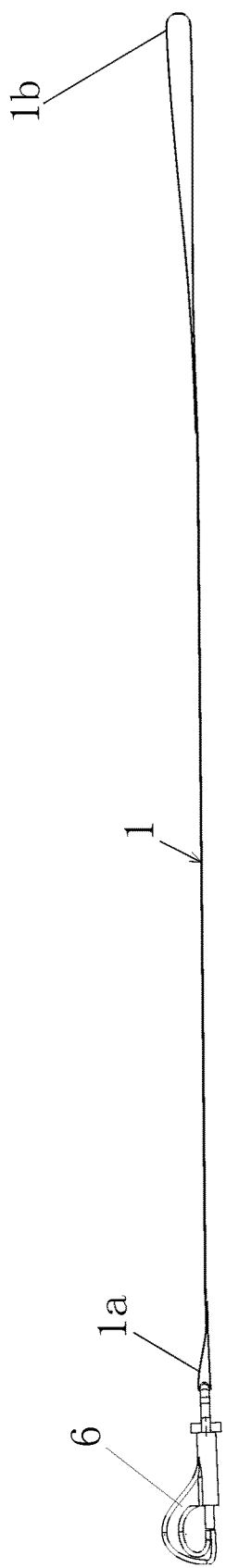
FIG. 2 is a schematic structural view of the leash in an example of the present invention.

List of reference numbers: 1. A leash; 1a. a pet connection end; 1b. a holding end; 1c. a reel fixing portion; 1d. a front leash; 1e. a rear leash; 1f. a holding hole;

2. a housing; 2a. a first leash outlet; 2b. a second leash outlet; 2c. a housing cavity; 2d. a left housing wall; 2e. a right housing wall; 2f. a lateral housing wall; 2g. a fixed shaft;

3. a reel; 3a. an arc-shaped slot;
4. a coil spring;
5. a metal pin; and
6. a buckle.

DETAILED DESCRIPTION OF PREFERRED EMBODIMENTS

FIGS. 2-7 show a specific example of this retractable pet traction rope of the present invention, which comprises a flat leash 1, whose two ends are respectively a pet connection end 1a for connecting a pet and a holding end 1b for a tractor to hold for control.

The key improvement of this example is that the pet traction rope further includes an elastic leash winding device, into which the leash 1 is wound, with both ends of the leash (i.e., the pet connection end 1a and the holding end 1b described above) respectively extending out of the elastic leash winding device. In a natural state, by the flexible winding effect of the elastic leash winding device, the leash 1 is wound in the elastic leash winding device only to expose both ends. When both ends of the leash 1 are pulled, the leash is extended outward by the tensile force.

The elastic leash reel mainly comprises three parts, a housing 2, a reel 3 and a coil spring 4. Wherein the housing 2 has a housing cavity 2c as well as a first leash outlet 2a and a second leash outlet 2b communicating the housing cavity with the environment. The reel 3 is rotatably disposed in the housing cavity 2c of the housing 2. With the coil spring 4 connected between the reel 3 and the housing 2, the coil spring 4 is torsionally deformed to exert a torsional restoring force in a backward direction on the reel 3 when the reel 3 is rotated in a forward direction with respect to the housing 2. As used herein, the forward and backward directions are relative, i.e., if one is clockwise, the other is counterclockwise.

The leash 1 has a reel fixing portion 1c located between the pet connection end 1a and the holding end 1b and fixedly connected with the reel 3. That is, a portion of the leash 1 between the pet connection end 1a and the holding end 1b is fixedly connected to the reel 3.

With the above reel fixing portion 1c as a separating point, the leash 1 is partitioned into a front leash 1d on the side close to the pet connection end 1a and a rear leash 1e on the side close to the holding end 1b.

With the above reel fixing portion 1c as a winding starting point, the front and rear leashes 1d, 1e are wound on the reel 3 in the same circumferential direction (clockwise or counterclockwise). The pet connection end 1a and the holding end 1b extend out of the housing 2 through the first and second leash outlets 2a, 2b, respectively.

Figure 3:
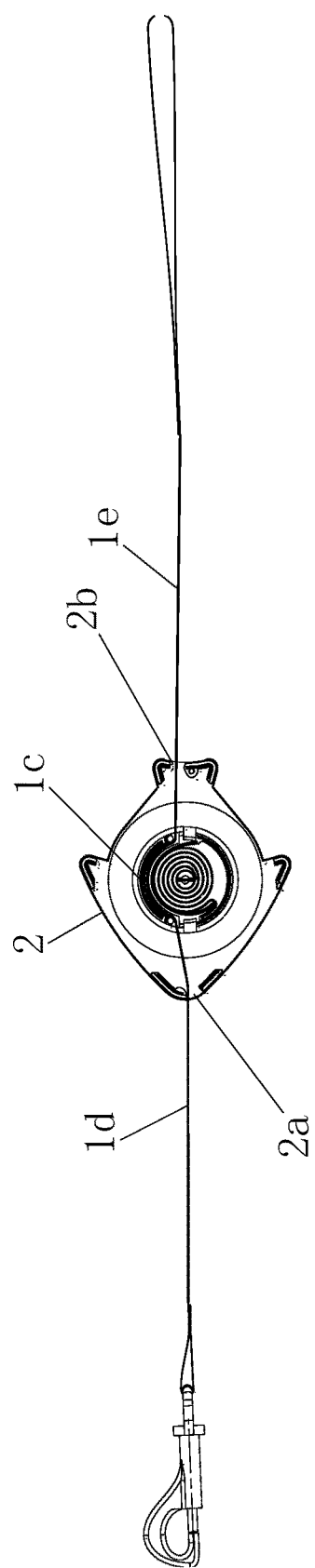
FIG. 3 is a schematic structural view of the pet traction rope fully extended and the housing opened in an example of the present invention.
Figure 4:
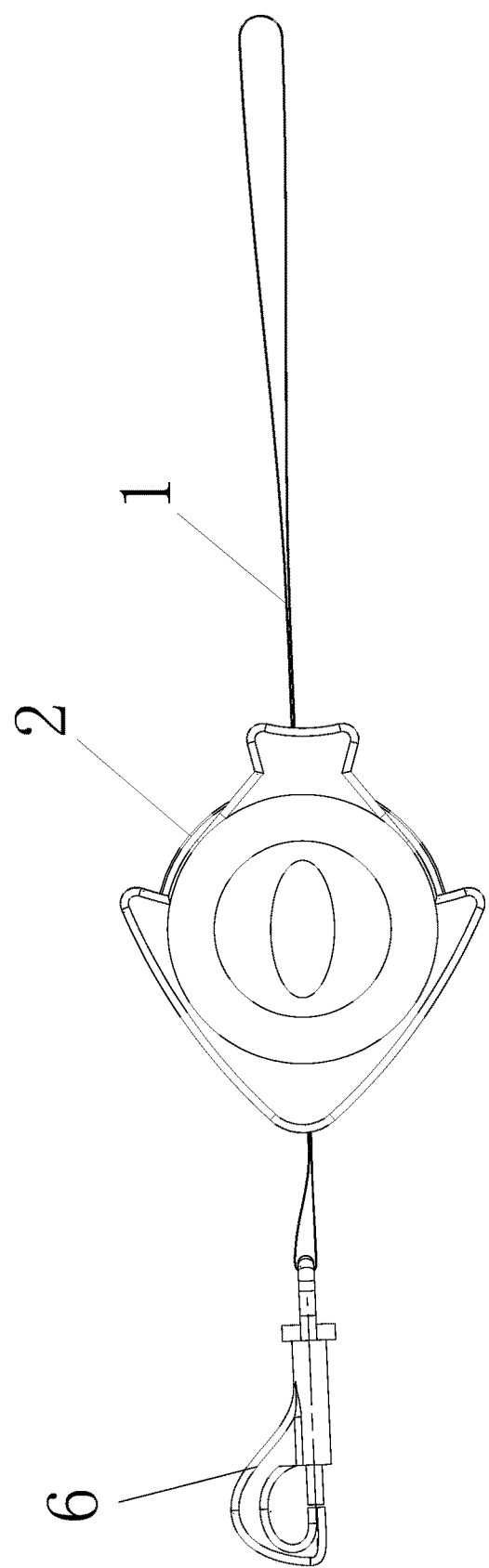
FIG. 4 is a schematic structural view of the pet traction rope fully wound up and the housing opened in an example of the present invention.
Figure 5:
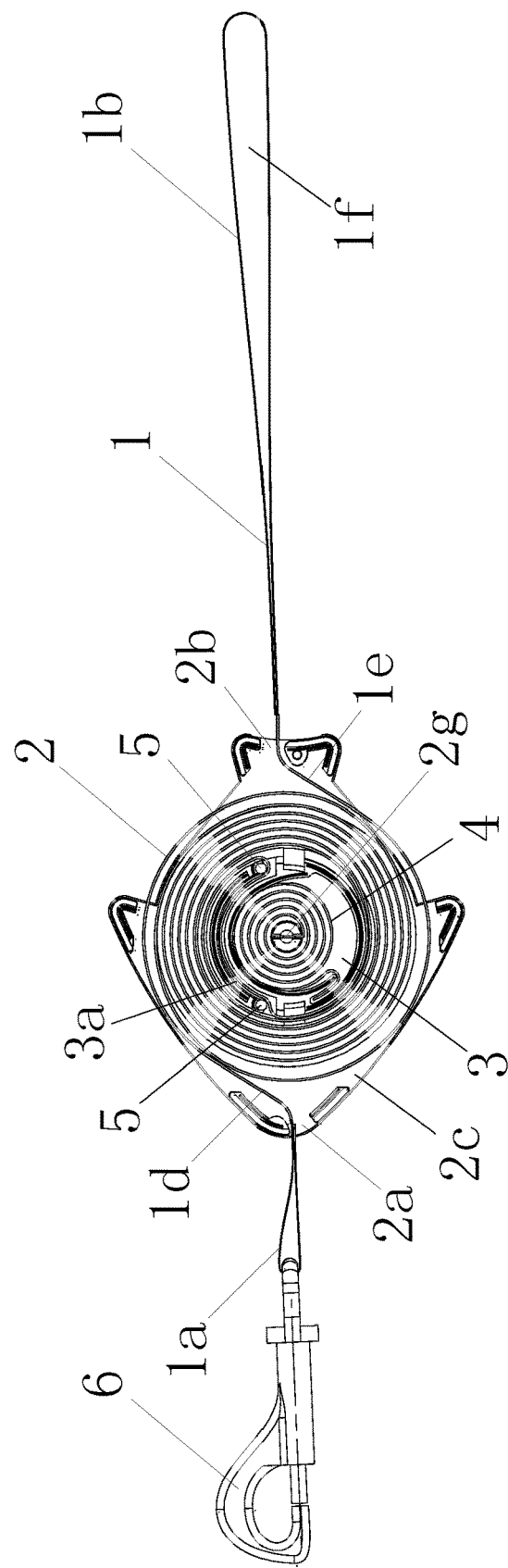
FIG. 5 is a schematic structural view of the appearance of the pet traction rope fully wound up in an example of the present invention.
Figure 6:
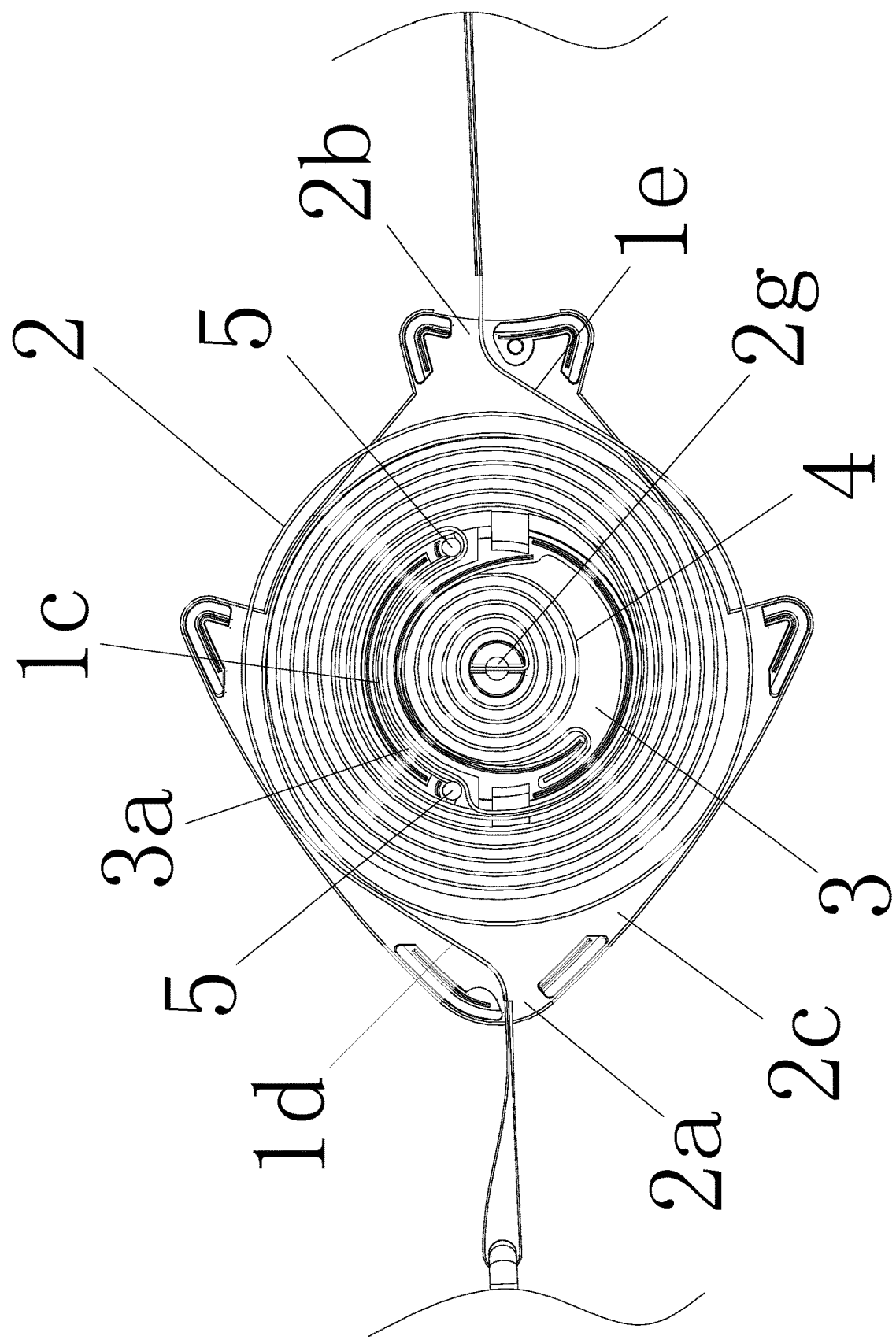
FIG. 6 is a schematic view of a partial (middle) structure of FIG. 5.
Figure 7:
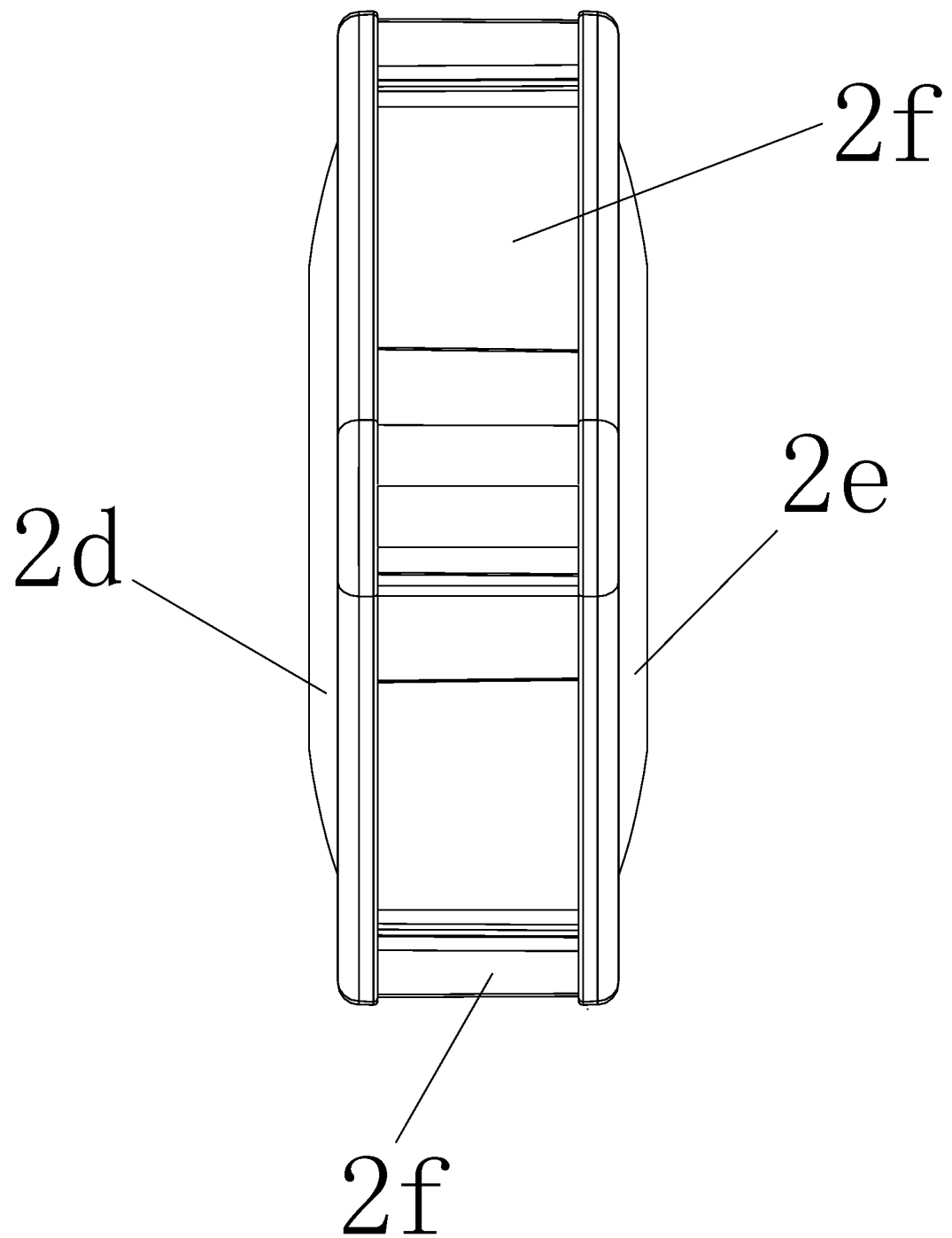
FIG. 7 is a schematic structural view of the housing in an example of the present invention.

As shown in FIGS. 4 and 5, in a natural state, the front and rear leashes 1d, 1e of the leash 1 are wound on the reel 3 in the same circumferential direction under the spring force of the coil spring 4, the leash 1 is in a fully wound-up state, and the pet connection end 1a and the holding end 1b extend out of the housing through the first and second leash outlets 2a, 2b, respectively. During the actual application, the pet owner grasps the holding end 1b on the rear side of the length of the leash 1, with the pet tied with the pet connection end 1a on the front side of the length of the leash 1. When the pet runs away to the distance, the leash 1 is subjected to the pet's pulling force to make the reel rotate in the forward direction, such that the leash 1 wound on the reel 3 is released outward. The front and rear leashes 1*d*, 1*e* of the leash 1 are released outward respectively through the first and second leash outlets 2*a*, 2*b*, during which the coil spring 4 is torsionally deformed to exert a torsional restoring force in a backward direction on the reel 3. When the pet runs far enough away, the front and rear leashes 1*d*, 1*e* of the leash 1 are completely unwound from the reel 3, leaving only the reel fixing portion 1*c* on the leash 1 to be connected with the reel 3, with the leash 1 completely released to reach the maximum extension length, as shown in FIG. 3. If the pet continues to vigorously run to the distance, the pulling force acting on the leash 1 will act directly on the pet owner's hand without exerting a significant force on the housing or reel. Just increasing the thickness of the leash can make the leash 1 itself high enough in the tensile strength, such that the pet owner can keep control of the pet and the pet will not tear off the leash and run away. When the pet gets close to the owner, the reel rotates in the reverse direction under the torsional spring force of the coil spring, so that the released leash is rewound on the reel.

In this example, the fixed connection between the reel fixing portion 1*c* on the leash 1 and the reel 3 is a detachable snap fit connection, by which the connection point between the leash 1 and the reel 3 can be adjusted, so as to adjust the length of the pet connection end 1*a* extending out of the housing when the leash is completely wound up. Specifically, an arc-shaped slot 3*a* is formed in the reel 3, and the length of the arc-shaped slot 3*a* penetrates through the reel 3 such that two through holes (i.e., the two ends of the arc-shaped slot 3*a*) are formed on the edge of the reel 3, with the reel fixing portion 1*c* of the leash 1 snap-fitted in the arc-shaped slot 3*a*.

In order to reduce the weight of the device, the housing 1 and the reel 3 are both made of a lightweight plastic material. As shown in FIG. 3, after the pet runs out to fully extend the leash 1 outward, the leash 1 is tightened as a whole, and the reel fixing portion 1*c* of the leash 1 is restrained by the arc-shaped slot 3*a* to be in a bent state. As a result, the reel fixing portion 1*c* of the leash 1 will exert upward pressure on the upper slot wall of the arc-shaped slot 3*a* in FIG. 3, such that the upper slot wall of the arc-shaped slot 3*a* (which is a part of the reel 3 and made of a plastic material) may be "torn" by the leash.

In order to prevent the upper slot wall of the arc-shaped slot 3*a* from being "torn" by the leash, two metal pins 5 respectively arranged at the two through holes are fixed on the reel 3 in this example, wherein the leash contacts the two metal pins 5 so that the pressure exerted by the reel fixing portion 1*c* of the leash 1 on the upper slot wall of the arc-shaped slot is transferred to the two metal pins 5. In order to reduce the sliding friction between the leash 1 and the metal pin 5 during retracting and releasing the leash 1, the metal pin 5 in this example adopts a cylindrical structure and is arranged parallel to the central axis of the reel 3.

Certainly, we can also fix the reel fixing portion 1*c* of the leash 1 directly on the outer edge of the reel 3 without providing the structure of the arc-shaped slot 3*a* as described above, and then there will be no longer the problem that the upper slot wall of the arc-shaped slot 3*a* is "torn" by the leash.

In this example, the housing 2 comprises a left housing wall 2*d* and a right housing wall 2*e* arranged in parallel and a lateral housing wall 2*f* vertically connected between the left and right housing walls 2*d*, 2*e*, with the first and second leash outlets 2*a*, 2*b* both formed in the lateral housing wall 2*f*.

In order to further reduce the weight of the housing, a plurality of weight reduction holes (not labeled in the figure) are provided on the lateral housing wall 2*f* in this example. Moreover, the arrangement of the weight-reducing holes increases the receiving space of the housing 2 to some extent, and is also convenient for the user to observe the internal conditions of the housing. In addition, the outer surface of the housing can be prevented from shrinking. After the weight-reducing holes are disposed, the lateral housing wall 2*f* is divided into a plurality of wall segments spaced apart along the circumferential direction, as shown in FIG. 5.

The housing 2 further comprises a fixed shaft 2*g* vertically fixed between the left and right housing walls 2*d*, 2*e*, with the coil spring 4 connected between the reel 3 and the fixed shaft 2*g*. The fixed shaft 2*g* is provided in the middle with a "-" shaped groove, in which is fixed one end of the coil spring 4.

In the positions corresponding to the two ends of the fixed shaft 2*g*, the outer surfaces of the left and right housing walls 2*d*, 2*e* are respectively provided with an oval recessed area, as shown in FIG. 4.

In this example, the first and second leash outlets 2*a*, 2*b* are arranged symmetrically on both sides of the fixed shaft 2*g* in the radial direction.

In order to facilitate the connection between the leash and the pet and meanwhile make it convenient for the owner of the pet to hold the leash, a buckle 6 is connected to the pet connection end 1*a* of the leash 1 in this example, and a holding hole 1*f* is formed in the holding end 1*b* of the leash 1.

In order to make it convenient for the user to tie the leash to railings and other objects, the holding end 1*b* of the leash 1 can also be connected with a buckle 6, which forms the above-mentioned holding hole 1*f* together with the leash body, with the portion of connection of the buckle 6 to the leash body able to be closed or opened to fix the leash at similar railings.

Certainly, the above examples are used only for explaining the technical concept and characteristics of the present invention. They are provided to make people understand and implement the present invention, but do not limit the scope of protection of the present invention. Any equivalent alteration or modification made according to the spiritual essence of the primary technical solution of the present invention should fall within the scope of protection of the present invention.

What is claimed is:

1. A retractable pet traction rope, comprising a leash (1), whose two ends are respectively a pet connection end (1*a*) for connecting a pet and a holding end (1*b*) for a tractor to hold for control, characterized in that:

the retractable pet traction rope further includes an elastic leash winding device, into which the leash (1) is wound, with both ends of the leash (1) respectively extending out of the elastic leash winding device; and the elastic leash winding device comprises:

a housing (2) having a housing cavity (2*c*) as well as a first leash outlet (2*a*) and a second leash outlet (2*b*) communicating the housing cavity with the environment, the first leash outlet (2*a*) and the second leash outlet (2*b*) being on a straight line passing a center of the housing (2);

a reel (3) rotatably disposed in the housing cavity (2*c*) of the housing (2); and a coil spring (4) connected between the reel (3) and the housing (2), and torsionally deformed to exert a torsional restoring force in a backward direction on the reel (3) when the reel (3) rotates in a forward direction with respect to the housing (2);

the leash (1) has a reel fixing portion (1c) located between the pet connection end (1a) and the holding end (1b) and fixedly connected with the reel (3); with the reel fixing portion (1c) as a separating point, the leash (1) is partitioned into a front leash (1d) on a side close to the pet connection end (1a) and a rear leash (1e) on a side close to the holding end (1b); with the reel fixing portion (1c) as a winding starting point, the front and rear leashes (1d, 1e) are wound on the reel (3) in the same circumferential direction; and the pet connection end (1a) and the holding end (1b) extend out of the housing (2) through the first and second leash outlets (2a, 2b), respectively.

2. The retractable pet traction rope according to claim 1, characterized in that: the reel fixing portion (1c) of the leash (1) is detachably snap-fitted on the reel (3).

3. The retractable pet traction rope according to claim 2, characterized in that: an arc-shaped slot (3a) is formed in the reel (3), and the length of the arc-shaped slot (3a) penetrates through the reel (3) such that two through holes are formed on an edge of the reel (3), with the reel fixing portion (1c) of the leash (1) snap-fitted in the arc-shaped slot (3a).

4. The retractable pet traction rope according to claim 3, characterized in that: two metal pins (5) respectively arranged at the two through holes are fixed on the reel (3).

5. The retractable pet traction rope according to claim 4, characterized in that: the metal pins (5) each have a cylindrical structure and are arranged parallel to a central axis of the reel (3).

6. The retractable pet traction rope according to claim 1, characterized in that: the reel fixing portion (1c) of the leash (1) is fixed on the edge of the reel (3).

7. The retractable pet traction rope according to claim 1, characterized in that: the housing (2) comprises a left housing wall (2d) and a right housing wall (2e) arranged in parallel and a lateral housing wall (2f) vertically connected between the left and right housing walls (2d, 2e), with the first and second leash outlets (2a, 2b) both formed in the lateral housing wall (2f).

8. The retractable pet traction rope according to claim 7, characterized in that: the lateral housing wall (2f) is provided with a weight reduction hole.

9. The retractable pet traction rope according to claim 7, characterized in that: the housing (2) further comprises a fixed shaft (2g) vertically fixed between the left and right housing walls (2d, 2e), with the coil spring (4) connected between the reel (3) and the fixed shaft (2g).

10. The retractable pet traction rope according to claim 1, characterized in that: a buckle (6) is connected to the pet connection end (1a) of the leash (1), and a holding hole (10) is formed in the holding end (1b) of the leash (1).

11. The retractable pet traction rope according to claim 1, characterized in that: a buckle (6) is respectively connected to the pet connection end (1a) and the holding end (1b) of the leash (1).

* * * * *